(12) United States Patent
Kokubu (10) Patent No.: US 10,425,574 B2
(45) Date of Patent: Sep. 24, 2019

(54) IMAGING DEVICE AND FOCUSING EVALUATION DEVICE

(71) Applicant: OLYMPUS CORPORATION, Tokyo (JP)

(72) Inventor: Kento Kokubu, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 43 days.

(21) Appl. No.: 15/716,799

(22) Filed: Sep. 27, 2017

(65) Prior Publication Data
US 2018/0020152 A1   Jan. 18, 2018

Related U.S. Application Data

(63) Continuation of application No. PCT/JP2015/074868, filed on Sep. 1, 2015.

(30) Foreign Application Priority Data

Mar. 27, 2015  (JP) ................................. 2015-067043

(51) Int. Cl.
*H04N 5/232* (2006.01)
*H04N 5/369* (2011.01)
(Continued)

(52) U.S. Cl.
CPC .......... *H04N 5/23212* (2013.01); *G02B 7/04* (2013.01); *G02B 7/282* (2013.01); *G02B 7/36* (2013.01);
(Continued)

(58) Field of Classification Search
CPC ............. H04N 5/23212; H04N 5/2253; H04N 5/3696; G02B 7/04; G02B 7/282; G02B 7/36; G03B 13/36
See application file for complete search history.

(56) References Cited

U.S. PATENT DOCUMENTS

| 4,561,749 A | 12/1985 | Utagawa |
| 2010/0194967 A1* | 8/2010 | Amano ..................... G02B 7/34 348/345 |

FOREIGN PATENT DOCUMENTS

| JP | H02-244019 A | 9/1990 |
| JP | H06-311412 A | 11/1994 |

(Continued)

OTHER PUBLICATIONS

English translation of International Preliminary Report on Patentability dated Oct. 12, 2017 together with the Written Opinion received in related International Application No. PCT/JP2015/074868.

(Continued)

*Primary Examiner* — Lin Ye
*Assistant Examiner* — Chriss S Yoder, III
(74) *Attorney, Agent, or Firm* — Scully, Scott, Murphy & Presser, P.C.

(57) ABSTRACT

An imaging device for evaluating focusing of light by one or more optical elements on an imaging sensor, the imaging device having one or more processors configured to compare a first value of a characteristic of a first signal from a first photoelectric conversion structure of the imaging sensor having a first light-receiving surface area and a second value of the characteristic of a second signal from a second photoelectric conversion structure of the imaging sensor having a second light-receiving surface area smaller than the first light-receiving surface area, and to determine whether focusing is achieved by the one or more optical elements.

11 Claims, 8 Drawing Sheets

(51) Int. Cl.
*G02B 7/04* (2006.01)
*G02B 7/28* (2006.01)
*G03B 13/36* (2006.01)
*H04N 5/225* (2006.01)
*G02B 7/36* (2006.01)

(52) U.S. Cl.
CPC .......... *G03B 13/36* (2013.01); *H04N 5/2253* (2013.01); *H04N 5/3696* (2013.01)

(56) References Cited

FOREIGN PATENT DOCUMENTS

| | | |
|---|---|---|
| JP | 2004-012815 A | 1/2004 |
| JP | 2011-022404 A | 2/2011 |
| JP | 2011-095027 A | 5/2011 |
| JP | 5219951 B2 | 6/2013 |
| JP | 2014-107593 A | 6/2014 |
| JP | 2014-235237 A | 12/2014 |

OTHER PUBLICATIONS

Japanese Office Action dated Aug. 21, 2018 in Japanese Patent Application No. 2017-509143.
International Search Report dated Dec. 1, 2015 issued in PCT/JP2015/074868.
Chinese Office Action dated Dec. 27, 2018 in Chinese Patent Application No. 201580075486.8.
Japanese Office Action dated Apr. 2, 2019 in Japanese Patent Application No. 2017-509143.

* cited by examiner

IMAGING DEVICE AND FOCUSING EVALUATION DEVICE

CROSS-REFERENCE TO RELATED APPLICATION

This application is a continuation of PCT International Application No. PCT/JP2015/074868, filed on Sep. 1, 2015, and is based upon and claims the benefit of priority from the prior Japanese Patent Application No. 2015-067043, filed on Mar. 27, 2015. The entire contents of PCT International Application No. PCT/JP2015/074868 and Japanese Patent Application No. 2015-067043 are incorporated herein by reference.

BACKGROUND

Field of the Invention

The present invention relates to an imaging device and a focusing evaluation device.

Description of the Related Art

Imaging devices having an auto-focus function are known. In an auto-focus operation, a position of a focus lens is controlled to make an evaluation value high, the evaluation value indicating a focusing state, for example. In this case, a so-called false focusing state may be caused, in which determination of focusing being achieved is wrongly made when the evaluation value becomes a local maximum value, instead of a maximum value.

For example, Japanese Patent No. 5219951 discloses a technology related to operating a diaphragm, acquiring images in a plurality of different diaphragm values, and comparing the images to determine the focusing state, when performing the auto-focus operation, in order to prevent the false focusing. To put it simply, an image indicating a similar evaluation value can be obtained regardless of the diaphragm value when focusing is achieved. Meanwhile, an image having a different evaluation value is obtained depending on the diaphragm value when the false focusing is performed. The false focusing is determined according to such a difference.

SUMMARY

In the technology disclosed in Japanese Patent No. 5219951, it is necessary to operate the diaphragm when determining the focusing state. Therefore, a time is required to obtain the images in the different diaphragm values, and correct evaluation cannot be performed when an object is moved during the obtainment of the images.

An objective of the present invention is to provide an imaging device and a focusing evaluation device that can perform prompt and accurate focusing evaluation.

According to one aspect of the present invention, an imaging device includes an imaging element including a normal pixel in which a light-receiving surface includes a first area, and a narrowed pixel in which a light-receiving surface includes a second area narrower than the first area, and a focusing evaluation unit that compares a first image acquired in the normal pixel and a second image acquired in the narrowed pixel to evaluate whether focusing is achieved.

Further, according to one aspect of the present invention, a focusing evaluation device is a focusing evaluation device that performs focusing evaluation based on an image acquired by an imaging element including a normal pixel in which a light-receiving surface includes a first area, and a narrowed pixel in which a light-receiving surface includes a second area narrower than the first area, and includes a focusing evaluation unit that compares a first image acquired in the normal pixel and a second image acquired in the narrowed pixel to evaluate whether focusing is achieved.

According to the present invention, an imaging device and a focusing evaluation device that can perform prompt and accurate focusing evaluation can be provided.

DETAILED DESCRIPTION

Figure 1:
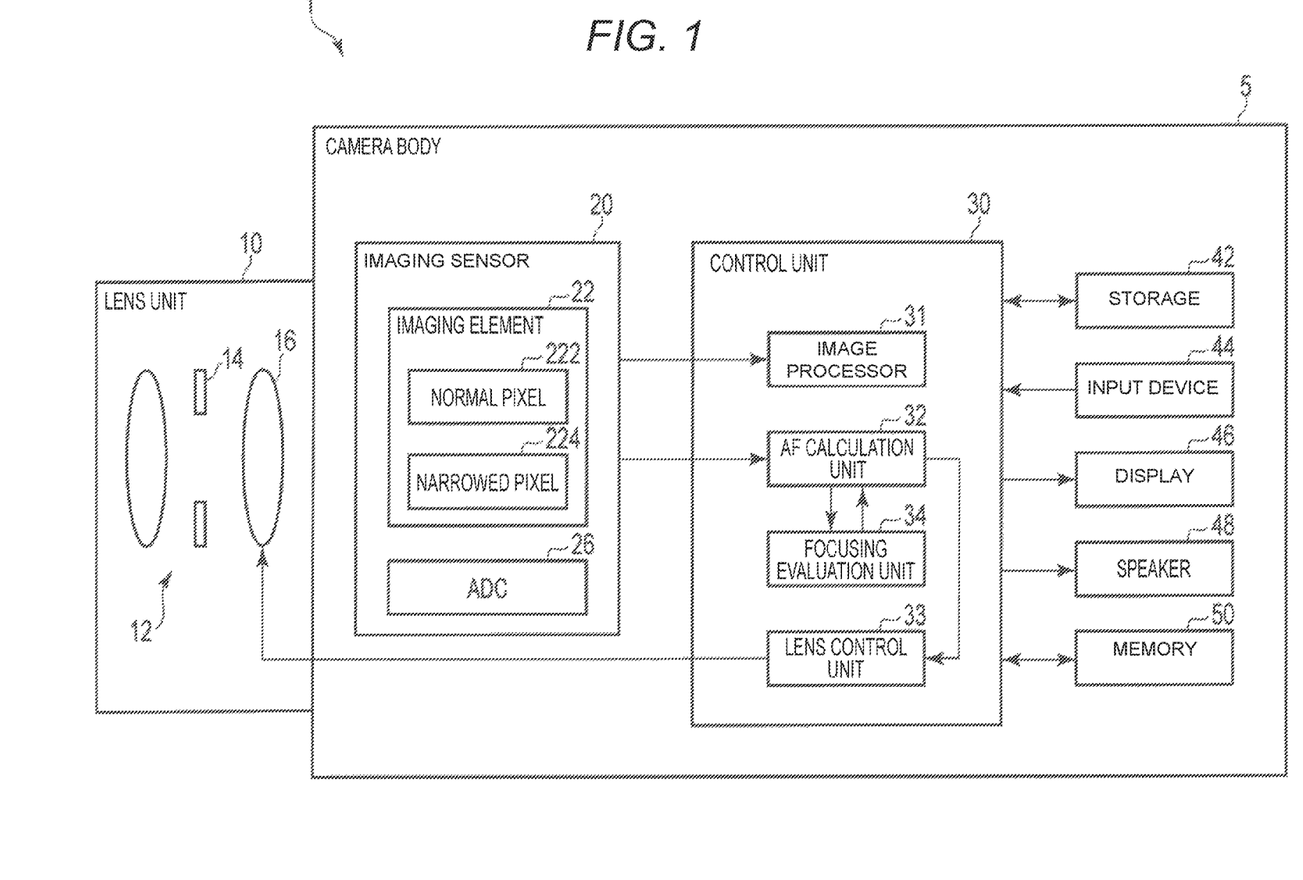
FIG. 1 is a block diagram illustrating an outline of a configuration example of an imaging device according to an embodiment.

An embodiment of the present invention will be described with reference to the drawings. FIG. 1 illustrates an outline of a configuration example of an imaging device 1 according to the present embodiment. As illustrated in FIG. 1, the imaging device 1 can include a camera body 5 and a lens unit 10. The lens unit 10 can include a lens group 12 including a plurality of lens. The lens group 12 can form an object image on an imaging surface of an imaging sensor 22 provided in the camera body 5 described below. The lens group 12 can include a focus lens 16 for changing a focusing position, similarly to a typical camera lens. The focus lens 16 can be a plurality of lenses. Further, the lens unit 10 may include a diaphragm 14, similarly to a typical camera lens. The lens unit 10 can be configured to be attachable/detachable to/from the camera body 5, for example.

The camera body 5 can include an imaging unit 20, a control unit 30, a storage 42, an input device 44, a display 46, a speaker 48, and a memory 50.

The imaging unit 20 can include the imaging sensor 22, an analog/digital converter (ADC) 26, and the like. The object image can be formed on the imaging surface of the imaging sensor 22 by the lens unit 10. The imaging sensor 22 can generate a signal based on the object image. The ADC 26 can generate a digital image signal based on the signal generated by the imaging sensor 22. The generated image signal can be output to the control unit 30. Note that the function of the ADC 26 may be provided in the imaging sensor 22.

A plurality of pixels can be arrayed in the imaging sensor 22. The plurality of pixels can be divided into one or more normal pixels 222 and one or more narrowed pixels 224. That is, in the imaging sensor 22 according to the present embodiment, apart of the plurality of pixels can serve as the narrowed pixel 224, and other pixels can serve as the normal pixels 222, as described below. The image signal can be created based on a signal photoelectrically converted by the normal pixels 222. The imaging sensor can be a CCD, a CMOS, or any kind of imaging detecting sensor.

The control unit 30 can control operations of respective units of the imaging device 1. The control unit 30 can include an image processor 31, an auto-focus (AF) calculation unit 32, a lens control unit 33, and a focusing evaluation unit 34.

The image processor 31 can acquire the image signal from the imaging unit 20, and can perform various types of typical image processing based on the image signal. The image processor 31 may create a live view image to be displayed in the display 46 described below, and may create a recording image to be recorded in the memory 50, for example.

The AF calculation unit 32 can perform auto-focus (AF) processing. That is, the AF calculation unit 32 can acquire information related to AF from the imaging unit 20, and can calculate an evaluation value related to AF, that is, an evaluation value that indicates the degree of focusing of the object image formed on the imaging sensor, based on the information. The AF calculation unit 32 can create information for moving the focus lens 16 to make the evaluation value high. The AF calculation unit 32 can calculate a contrast evaluation value of the image acquired by the imaging sensor 22, for example. The AF calculation unit 32 can create information for moving the focus lens 16 to make the contrast evaluation value high. The evaluation value is not limited to the contrast evaluation value, and may be an evaluation value based on a signal related to a phase difference, for example, or another evaluation value. The AF calculation unit 32 can output the information for moving the focus lens 16 to the lens control unit 33. Further, when determining that focusing is achieved, the AF calculation unit 32 can output the fact of focusing being achieved to the focusing evaluation unit 34.

The lens control unit 33 can control the position of the focus lens 16 based on the information acquired from the AF calculation unit 32. The focus lens 16 can be operated under control of the lens control unit 33.

The focusing evaluation unit 34 can perform focusing evaluation processing when receiving the signal indicating the fact of focusing being achieved from the AF calculation unit 32. That is, the focusing evaluation unit 34 can evaluate whether a current state of the focus lens 16 is in a focusing state or a false focusing state. The focusing evaluation unit 34 can output an evaluation result to the AF calculation unit 32. The AF calculation unit 32 can maintain the current state if the current state is the focusing state, and can perform auto-focus processing again if the current state is the false focusing state, based on the evaluation result.

The control unit 30 can control various operations of the imaging device 1 such as an operation of the imaging unit 20, an operation of the display 46, and control related to recording of an image to the memory 50, in addition to the above-described operations.

The control unit 30 can include one or a plurality of central processing units (CPUs), an application specific integrated circuit (ASIC), or the like, and performs various types of calculation. That is, the control unit 30 can be one or more processors comprising hardware that can implement one or more units. The operation of the control unit can be performed according to programs stored in a storage region provided in the control unit 30 or in the storage 42.

The storage 42 can store the programs for control performed in the control unit 30, and various parameters. The storage 42 can output various types of information to the control unit 30 in response to a request from the control unit 30.

The input device 44 can include an input unit for the various operations. The input device 44 can include a release button, for example. When the release button is half pressed by a user, a first switch can be turned ON. When the first switch is turned ON, an AF operation can be started. Further, when the release button is pressed to the end, a second switch can be turned ON. When the second switch is turned ON, an imaging operation can be performed. That is, the control unit 30 can cause the imaging unit 20 to perform the imaging operation, and the image processor 31 can process an obtained image for use of recording, and a processed image is recorded in the memory 50.

The display 46 can include a typical display. The display 46 can include a liquid crystal display panel, for example. The display 46 can display a live view image, a rec view image after the imaging operation, a reproduced image of the image recorded in the memory 50, and the like. Further, the display 46 can display a state of the imaging device 1 and various types of information related to setting.

The speaker 48 can output an audio under control of the control unit 30. When focusing is achieved, the speaker 48 can output a sound indicating the fact of focusing being achieved.

The memory 50 can be detachably connected to the camera body 5, and can record an image acquired through imaging by the imaging device 1, for example.

Figure 2:
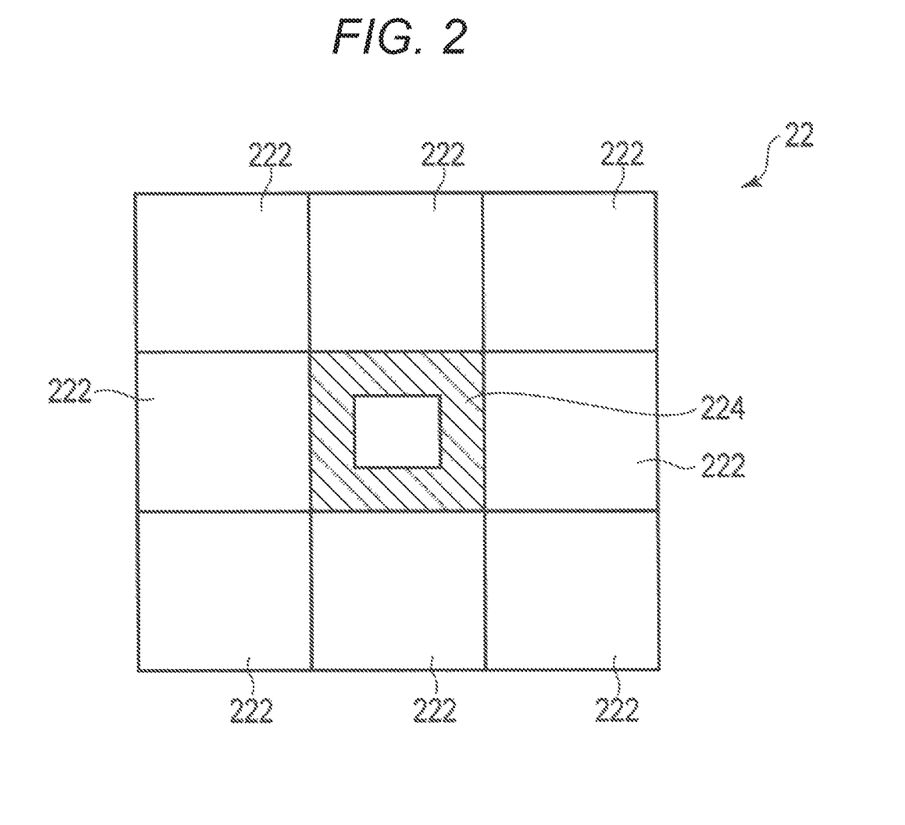
FIG. 2 is a schematic diagram illustrating an outline of a configuration example of an imaging element including normal pixels and a narrowed pixel.

A configuration example of the imaging sensor 22 according to the present embodiment will be described with reference to FIGS. 2 and 3. FIG. 2 schematically illustrates a part of the imaging surface of the imaging sensor 22 of the present embodiment. A plurality of pixels is provided on the imaging surface of the imaging sensor 22. The plurality of pixels is divided into two types of pixels. That is, the imaging sensor 22 is provided with the plurality of normal pixels 222 and the plurality of narrowed pixels 224. The plurality of normal pixels 222 are pixels used for image acquisition, similarly to a pixel provided in a typical imaging sensor. In contrast, the plurality of narrowed pixels 224 are pixels obtained such that a part of the plurality of normal pixels 222 are covered with a mask. Incident light is shaded in the masked portion of the plurality of narrowed pixels 224. In FIG. 2, the portion with the slant lines is the masked portion, and the plurality of narrowed pixels 224 are configured such that only a central portion is open, and an incident ray of light is shaded in a peripheral edge portion.

As described above, when an area of a light-receiving surface of the normal pixel 222 is a first area, a second area of a light-receiving surface that is an opening portion of the narrowed pixel 224 is narrower than the first area.

Figure 3:
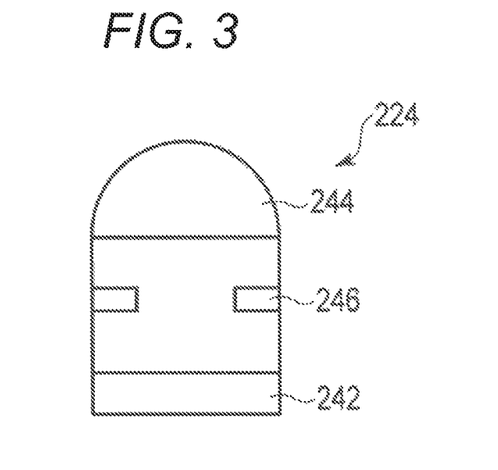
FIG. 3 is a side schematic diagram illustrating an outline of a configuration example of a narrowed pixel.

FIG. 3 illustrates a side view illustrating an outline of a configuration example of the narrowed pixel 224. As illustrated in FIG. 3, the narrowed pixel 224 can be provided with a light-receiving sensor 242 and a micro lens 244. A luminous flux arriving from an object can be incident on the light-receiving sensor 242 including a photodiode through the micro lens 244. In the narrowed pixel 224, a mask 246 can be provided between the micro lens 244 and the light-receiving sensor 242. The mask 246 can shade a part of the ray of light incident on the light-receiving sensor 242 through the micro lens 244. The normal pixel 222 is not provided with the mask 246. Configurations of the normal pixel 222 and the narrowed pixel 224 are similar except existence/non-existence of the mask 246.

Figure 4:
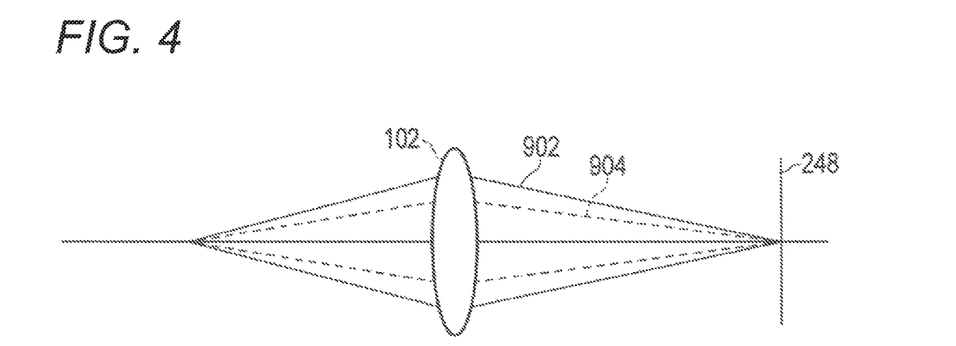
FIG. 4 is a diagram illustrating an outline of a luminous flux of when focusing is achieved.
Figure 5:
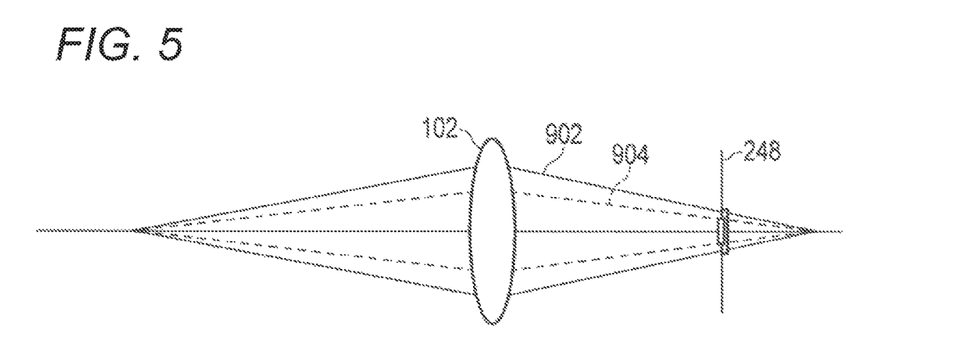
FIG. 5 is a diagram illustrating an outline of a luminous flux of when focusing is not achieved.

A difference between information acquired in the normal pixel 222 and information acquired in the narrowed pixel 224 will be described with reference to FIGS. 4 and 5. FIG. 4 illustrates a relationship between a luminous flux and a light-receiving surface 248 of the light-receiving sensor of when focusing is correctly achieved, and FIG. 5 illustrates a relationship between the luminous flux and the light-receiving surface 238 of the light-receiving sensor of when focusing is not achieved. In FIGS. 4 and 5, the solid lines 902 indicating a luminous flux illustrate a luminous flux of a ray of light that has passed through a lens 102 that schematically illustrates the lenses and the diaphragm of the lens unit 10. Meanwhile, the broken lines 904 illustrating a luminous flux indicate a narrowed luminous flux that is not shaded with the mask 246 in the narrowed pixel 224, of the luminous flux of a ray of light that has passed through the lens 102. In other words, the solid lines 902 indicate the luminous flux received in the normal pixel 222, and the broken lines 904 indicate the luminous flux received in the narrowed pixel 224.

As illustrated in FIG. 4, in the case of the correct focusing, an image received in the plurality of normal pixels 222 and an image received in the plurality of narrowed pixels 224 accord with each other. In contrast, as illustrated in FIG. 5, in the case of not focusing, the image received in the plurality of normal pixels 222 and the image received in the plurality of narrowed pixels 224 become different images. In the present embodiment, the focusing evaluation unit 34 can compare the image acquired in the plurality of normal pixels 222 and the image acquired in the plurality of narrowed pixels 224, and can determine whether focusing is correctly achieved according to whether there is a difference.

In the present embodiment, an image created based only on an output of the plurality of normal pixels 222 can be referred to as a first image. Meanwhile, an image created based only on an output of the plurality of narrowed pixel 224 can be referred to as a second image. In the present embodiment, evaluation of whether focusing is correctly achieved is performed by the focusing evaluation unit 34, based on the first image and the second image.

Figure 6:
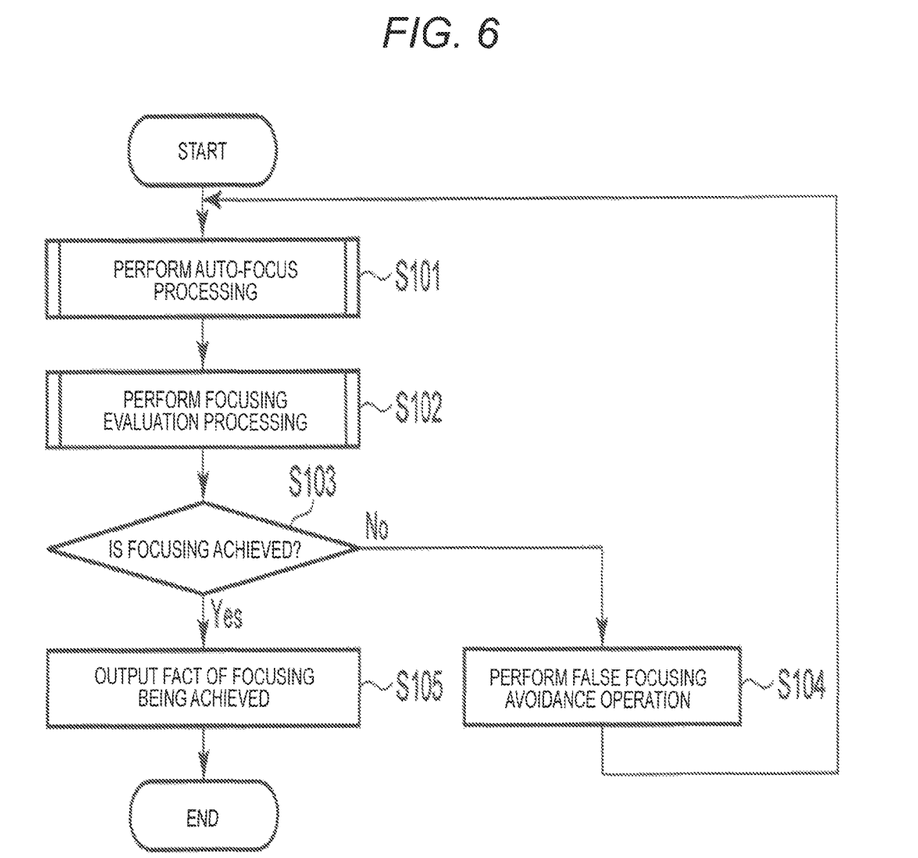
FIG. 6 is a flowchart illustrating an example of processing related to auto-focus according to an embodiment.

Processing related to auto-focus of the present embodiment will be described with reference to the flowchart illustrated in FIG. 6. The processing related to auto-focus can be performed when the release button is half pressed, and a first release switch is turned ON, for example.

At step S101, the control unit 30 can perform the auto-focus processing. The auto-focus processing is known processing for performing auto-focus. For example, processing of a contrast detection system can be performed. In the contrast detection system, the AF calculation unit 32 can calculate the contrast evaluation value as an evaluation value based on contrast, while the focus lens 16 of the lens unit 10 is moved. When the contrast evaluation value is increased when the lens control unit 33 moves the focus lens 16, the lens control unit 33 can continuously move the focus lens 16 in the moving direction, and when the contrast evaluation value is decreased, the lens control unit 33 can move the focus lens 16 in an opposite direction. In this way, the lens control unit 33 can move the focus lens 16 to a position where the contrast evaluation value is locally maximized. When the contrast evaluation value is locally maximized, the AF calculation unit 32 can determine that focusing is achieved, and can terminate the auto-focus processing. Following that, the processing can proceed to step S102. The system of the auto-focus processing is not limited to the contrast detection system, and the processing may be performed according to a phase difference detection system.

At step S102, the focusing evaluation unit 34 of the control unit 30 can perform focusing evaluation processing. The focusing evaluation processing will be described with reference to FIG. 7.

Figure 7:
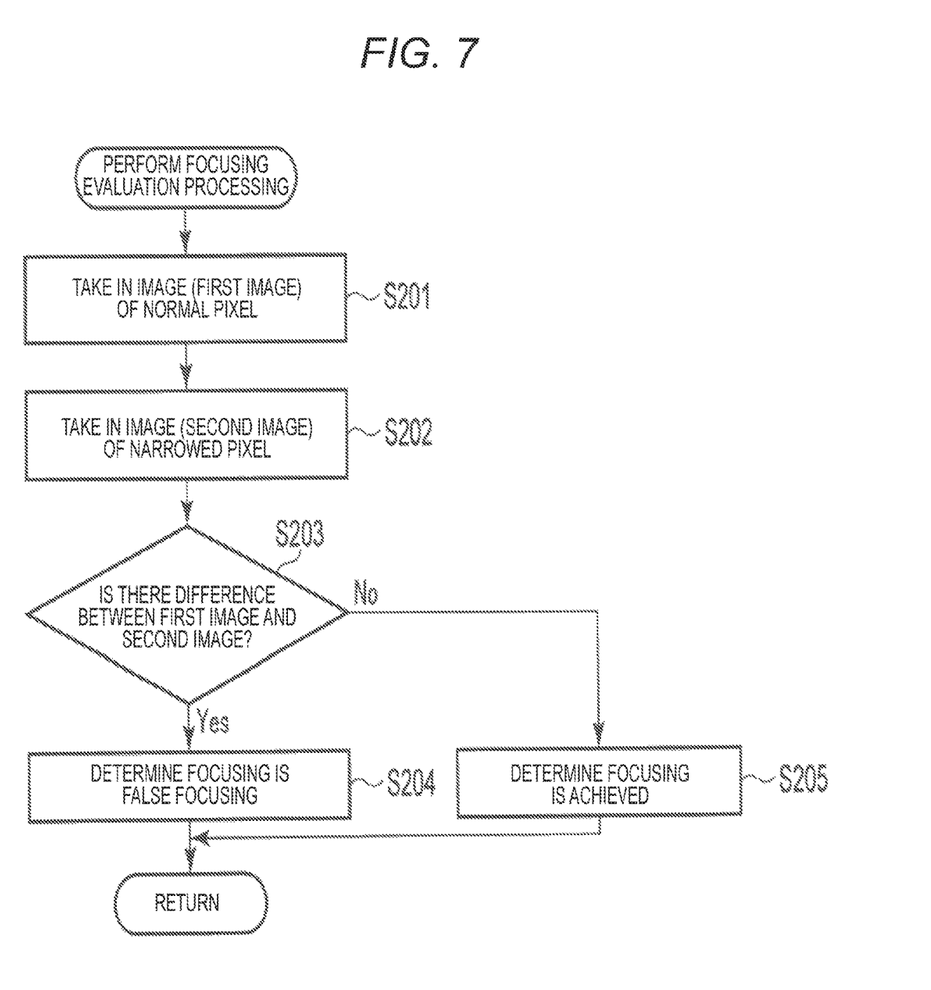
FIG. 7 is a flowchart illustrating an example of focusing evaluation processing according to an embodiment.

At step S201, the focusing evaluation unit 34 can take in an image by the plurality of normal pixels related to an object to be focused, that is, the first image.

At step S202, the focusing evaluation unit 34 can take in an image by the plurality of narrowed pixels related to an object to be focused, that is, the second image.

At step S203, the focusing evaluation unit 34 can determine whether there is a difference between the first image and the second image. Whether there is a difference between the first image and the second image can be determined using some sort of evaluation values that indicate characteristics of the first image and the second image. As the evaluation values, the contrast evaluation values can be used, for example. In this case, if there is a difference between the contrast evaluation value of the first image and the contrast evaluation value of the second image, it can be determined that there is a difference between the first image and the second image. Meanwhile, if there is no difference between the contrast evaluation value of the first image and the contrast evaluation value of the second image, it can be determined that there is no difference between the first image and the second image. Note that the evaluation values used in this determination are not limited to the contrast evaluation values. Other evaluation values may be used. The narrowed pixel 224 can be arranged in the imaging sensor 22 to such an extent that the evaluation values such as the contrast evaluation values can be obtained.

At step S203, when it is determined that there is a difference between the first image and the second image, the processing can proceed to step S204. At step S204, the focusing evaluation unit 34 can determine that the focusing determined in the auto-focus processing is false focusing. Following that, the focusing evaluation processing can be terminated, and the processing is returned to the processing described with reference to FIG. 6.

At step S203, when it is not determined that there is a difference between the first image and the second image, the processing can proceed to step S205. At step S205, the focusing evaluation unit 34 can determine that the focusing determined in the auto-focus processing is correct focusing. Following that, the focusing evaluation processing can be terminated, and the processing can be returned to the processing described with reference to FIG. 6.

Referring back to FIG. 6, and description will be continued. After the focusing evaluation processing, the processing can proceed to step S103.

At step S103, the control unit 30 can determine whether the focusing is evaluated in the focusing evaluation processing. When the focusing is not evaluated, that is, when the focusing is determined as the false focusing, the processing can proceed to step S104.

At step S104, the control unit 30 can perform a false focusing avoidance operation. In the false focusing avoidance operation, operations below can be performed, for example. That is, the control unit 30 can move the focus lens 16 to a focus direction that has varied just before the termination of the auto-focus processing, that is, to a direction into which the focus lens 16 has been moved immediately before the contrast evaluation value is locally maximized, by a predetermined moving amount. Instead, the control unit 30 may move the focus lens 16 to a correct focusing position that is estimated based on a difference amount between the evaluation value of the first image and the evaluation value of the second image calculated in step S203 in the focusing evaluation processing, or to a state in which danger of the false focusing is low. Further, when the false focusing avoidance operation is performed twice or more, the focus lens may be moved to a reverse direction to a direction into which the focus lens has been moved in the previous false focusing avoidance operation. After the false focusing avoidance operation, the processing can be returned to step S101. That is, the auto-focus processing can be performed again.

Note that the false focusing avoidance operation of step S104 is not necessarily required. For example, when the imaging device 1 is configured to be able to switch the processing to manual focus when the focusing is determined as the false focusing after the auto-focus operation, the false focusing avoidance operation of step S104 is not necessary.

When the focusing is evaluated at step S103, the processing can proceed to step S105. At step S105, the control unit 30 can output the fact of focusing being achieved. As a result, a figure that indicates the focusing is in the focusing state can be displayed in the display 46, or a sound that indicates the focusing is in the focusing state can be output from the speaker 48. After the processing of step S105, the present processing can be terminated.

Figure 8A:
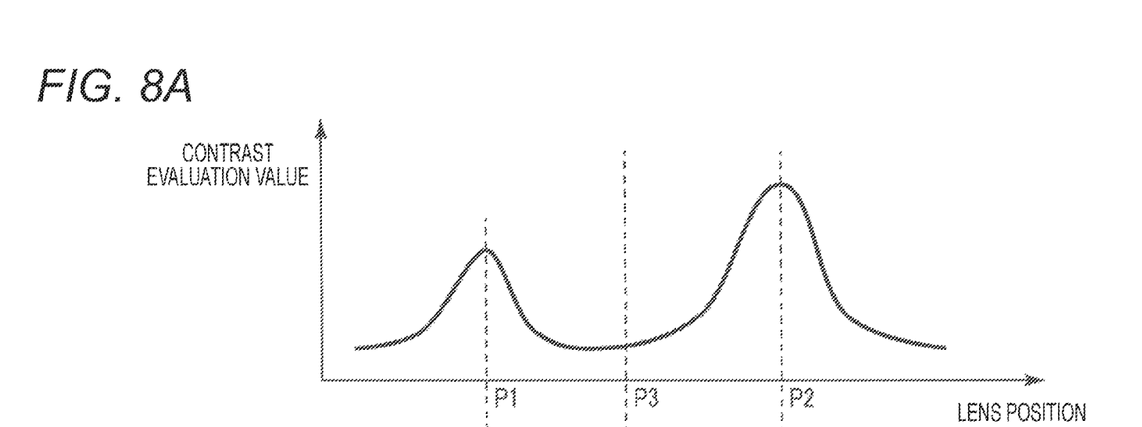
FIGS. 8A and 8B are diagrams for describing a contrast evaluation value with respect to a lens position, and change of the lens position with respect to a time.
Figure 8B:
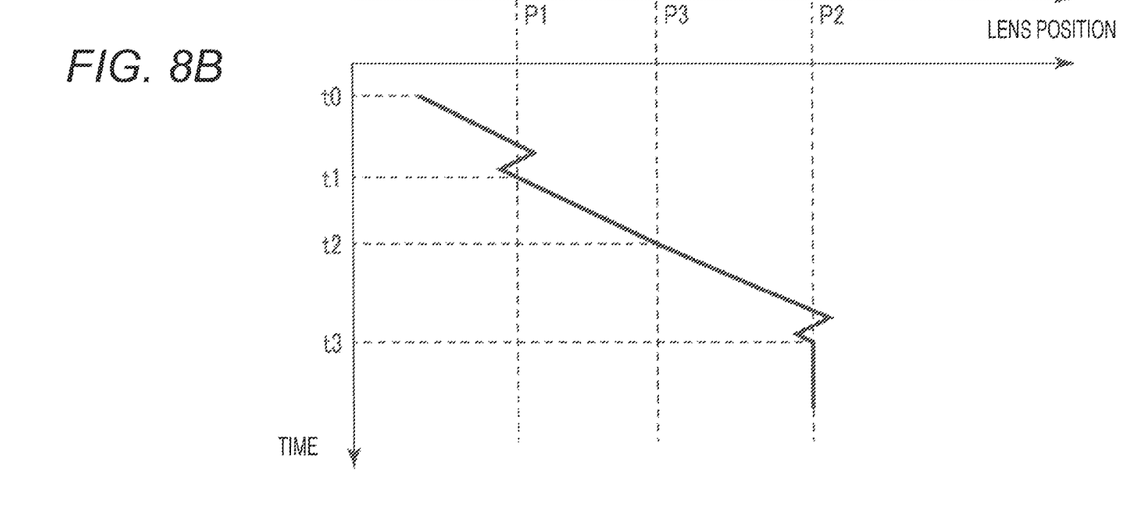

An example of an operation performed in the processing related to auto-focus will be described with reference to FIGS. 8A and 8B. FIG. 8A, which is the upper diagram, illustrates a lens position in the horizontal axis and a contrast evaluation value in the vertical axis. FIG. 8B, which is the lower diagram, illustrates a lens position in the horizontal axis similarly to FIG. 8A and an elapsed time in the vertical axis. As illustrated in FIG. 8A, the contrast evaluation value is a local maximum value in a first lens position P1 and a second lens position P2. Here, the contrast evaluation value in the second lens position P2 is larger than the contrast evaluation value in the first lens position P1, and the second lens position P2 is a lens position in which correct focusing can be obtained.

As illustrated in FIG. 8B (the lower diagram), an operation of auto-focus is started at a time t0. First, in the auto-focus processing of step S101, the AF calculation unit 32 can perform a search for the focusing position by so-called mountain climbing AF based on the contrast evaluation value. Regarding the lens position, a direction on the right side in FIGS. 8A and 8B is referred to as a first direction, and the opposite direction is referred to as a second direction. First, the lens position can be moved to a direction into which the contrast evaluation value is increased according to a calculation result of the AF calculation unit 32 under control of the lens control unit 33. That is, first, the lens position can be moved to the first direction. When the lens position passes through the first lens position P1 where the contrast evaluation value becomes a local maximum value, the moving direction of the lens can be changed to the second direction, and when the lens position passes through the first lens position P1 again, the moving direction of the lens can be changed to the first direction. In this way, at a time t1, the lens position is set to the first lens position P1 where the contrast evaluation value is locally maximized. At this time, the auto-focus processing of step S101 can be terminated, and the AF calculation unit 32 can output a signal indicating the fact of focusing being achieved to the focusing evaluation unit 34.

In the focusing evaluation processing of step S102, the focusing evaluation unit 34 can perform determination of whether focusing or false focusing. Since the correct focusing can be obtained in the second lens position P2, the focusing can be determined as the false focusing in the first lens position P1 at the time t1.

As a result, the false focusing avoidance operation of step S104 can be performed. That is, during from the time t1 to a time t2, the lens position can be moved from the first lens position P1 to a third lens position P3.

At the time t2 and a subsequent time, the auto-focus processing of step S101 can be performed again. With the auto-focus processing, the lens position can be set to the second lens position P2 at a time t3. At the time t3, the focusing evaluation processing of step S102 can be performed again. In the focusing evaluation processing, focusing can be determined as the correct focusing. As a result, at step S105, the fact of focusing being achieved can be output, and the processing related to auto-focus can be terminated.

According to the present embodiment, even in a state where focusing being achieved is determined using the evaluation value that evaluates the degree of focusing used in the auto-focus operation, such as the contrast evaluation value, whether the determination is correct, that is, whether the focusing is the correct focusing or the false focusing can be determined. As a result, the false focusing state can be avoided. Further, in the present embodiment, whether the focusing is the correct focusing or the false focusing can be determined based on the difference between the first image acquired in the normal pixel 222 and the second image acquired in the narrowed pixel 224, the pixels being embedded in the imaging element. Therefore, mechanical operation cannot be required, and a high-speed operation can be possible. That is, for example, the present embodiment can enable a higher-speed operation than a case where the state of the diaphragm 14 of the lens unit 10 is changed to a released state and to a narrowed state, and an image in the released state and an image in the narrowed state are compared.

In the above-described embodiment, a configuration of a case where the imaging device 1 is a lens interchangeable digital camera including a mirrorless interchangeable-lens camera or a single-lens reflex camera has been described with reference to FIG. 1. However, the imaging device 1 is not limited to the lens interchangeable digital camera. The imaging device 1 may be a digital camera, called compact digital camera, in which the lens is fixed to the camera body.

Further, the imaging device 1 may be a camera configured from a combination of a lens type camera and a mobile information terminal. That is, the lens type camera can have functions of the lens unit 10, the imaging unit 20, and the like. Further, the mobile information terminal can be a smart phone, for example, and has functions of the control unit 30, the storage 42, the display 46, and the like. Such lens type camera and mobile information terminal may have communication by wireless or wired means, and integrally function as the imaging device 1.

Further, the technology according to the present embodiment can be applied to various optical devices provided with an auto-focus mechanism, and used together with the imaging sensor including the plurality of normal pixels and the plurality of narrowed pixels. Examples of such an optical device can include a microscope, an endoscope, a telescope, and a pair of binoculars. For example, a microscope system as follows can be considered. That is, a camera unit including the imaging sensor including the plurality of normal pixels and the plurality of narrowed pixels can be mounted to a microscope. A signal output from the camera unit can be input to, for example, a personal computer having a function similar to the control unit 30. The personal computer can perform calculation related to auto-focus, and can operate a focal point adjustment mechanism of the microscope. Similarly, an endoscope system as follows can be considered. That is, the imaging sensor including the plurality of normal pixels and the plurality of narrowed pixels can be provided on a tip of the endoscope. A signal output from the imaging sensor can be input to a controller of the endoscope. The controller can perform calculation related to auto-focus, and can operate a focal point adjustment mechanism of the endoscope.

As described above, the configuration elements included in the imaging device 1 may be arranged in any device.

Further, a focusing evaluation device having a function to determine whether the auto-focus is in the focusing state or the false focusing state may just have the focusing evaluation unit 34 in the control unit 30. Further, a focusing evaluation device having a function to control the auto-focus while determining whether the auto-focus is in the focusing state or the false focusing state may just has the AF calculation unit 32 and the lens control unit 33, in addition to the focusing evaluation unit 34. In such focusing evaluation devices, the image processor 31 and the like are not necessarily required. Further, the focusing evaluation device may not include the storage 42, the input device 44, the display 46, the speaker 48, and the memory 50. The imaging sensor 22 including the plurality of normal pixels 222 and the plurality of narrowed pixels 224, which generates the image signal to be input to the focusing evaluation device, can be provided as a separate body from the focusing evaluation device. Further, the lens group 12 including the focus lens 16 that is an object to be controlled by the focusing evaluation device can be provided as a separate body from the focusing evaluation device. Similarly, the imaging device 1 may not include any of or all of the image processor 31, the storage 42, the input device 44, the display 46, the speaker 48, and the recording device 50.

Further, the focusing evaluation device as described above may be arranged in any device. That is, the focusing evaluation device may be provided in the camera body 5 of the imaging device 1, like the above-described embodiment, or may be provided in the lens unit 10. Further, the focusing evaluation device may be provided in the lens type camera or may be provided in the mobile information terminal, of a system including the lens type camera and the mobile information terminal. Further, the focusing evaluation device can be provided in a personal computer of a microscope system, or can be provided in a controller of an endoscope system.

[Modification]

A modification of the present invention will be described. Here, different points from the above-described embodiment will be described, and the same portion is denoted with the same reference sign and description thereof is omitted.

Figure 9:
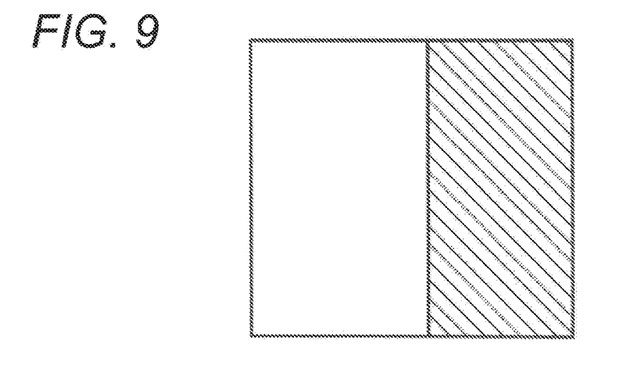
FIG. 9 is a front schematic diagram illustrating an outline of a configuration example of a narrowed pixel according to a modification.
Figure 10:
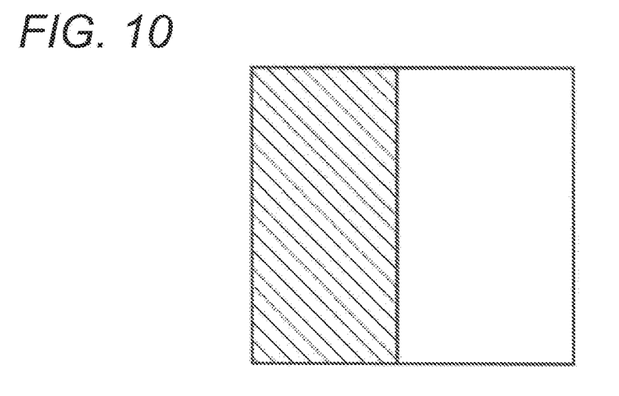
FIG. 10 is a front schematic diagram illustrating an outline of a configuration example of a narrowed pixel according to a modification.

A masked region in a narrowed pixel 224 may not be a peripheral edge portion of a pixel as illustrated in FIG. 2. For example, as illustrated in FIGS. 9 and 10, a pixel, a half of which is masked, may be used as the narrowed pixel 224. Therefore, a pixel for phase difference detection in a so-called imaging plane phase difference imaging element, in which pixels for detecting a defocus amount are arranged on a light-receiving surface of the imaging element, can be used as the narrowed pixel 224. In this case, a second image is created based only on a plurality of pixels, an each right half of which is masked, for example. Alternatively, the second image is created based only on a plurality of pixels, an each left half of which is masked, for example. Further, a narrowed pixel 224 with a right side open may be used in the right side of an imaging region, for example, and a narrowed pixel 224 with a left side open may be used in the left side of an imaging region, for example. The narrowed pixel 224 is not limited to having the form in which a half of the pixel is masked, and may have a form in which a more than half or a less than half of the pixel is masked.

Further, the opening in the narrowed pixel 224 is not limited to the rectangular, and may be a circle, for example. Further, the opening in the narrowed pixel 224 may only be a central region of regions vertically divided into three, like the white portion of Tricolor, for example.

Figure 11:
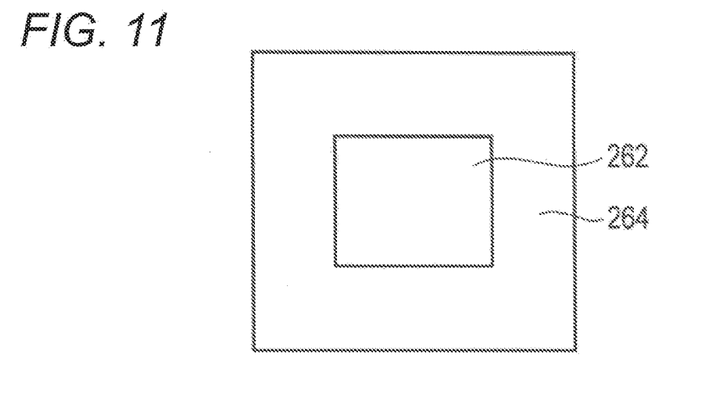
FIG. 11 is a front schematic diagram illustrating an outline of a configuration example of a narrowed pixel according to a modification.

Further, as illustrated in FIG. 11, an imaging sensor including a pixel that is divided into two regions of a central portion 262 and an outer peripheral portion 264 may be used. In this imaging sensor, a light-receiving signal acquired in the central portion 262 and a light-receiving signal acquired in the outer peripheral portion 264 can be individually acquired. Therefore, a combination of the light-receiving signal acquired in the central portion 262 and the light-receiving signal acquired in the outer peripheral portion 264 is used as a signal acquired in a normal pixel 222, and only the light-receiving signal acquired in the central portion 262 can be used as a signal acquired in a narrowed pixel 224. That is, the combination of the light-receiving signal acquired in the central portion 262 and the light-receiving signal acquired in the outer peripheral portion 264 is used for creation of a first image, and the light-receiving signal acquired in the central portion 262 is used for creation of a second image. Note that the signal acquired in the outer peripheral portion 264 may be used as the signal acquired in the narrowed pixel 224.

Figure 12:
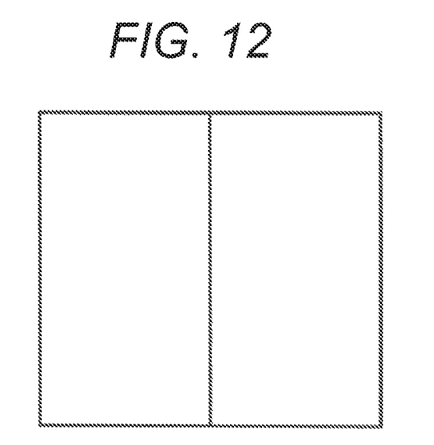
FIG. 12 is a front schematic diagram illustrating an outline of a configuration example of a narrowed pixel according to a modification.
Figure 13:
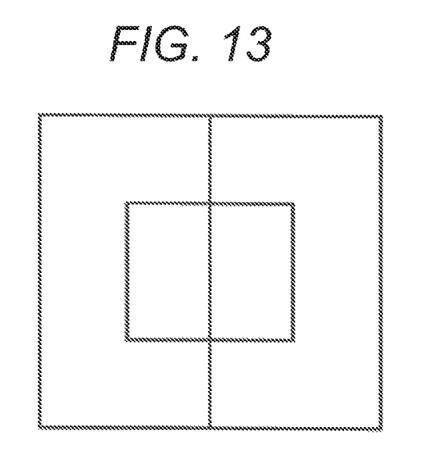
FIG. 13 is a front schematic diagram illustrating an outline of a configuration example of a narrowed pixel according to a modification.

Further, the way of dividing one pixel is not limited to the division into the central portion and the outer peripheral portion, as illustrated in FIG. 11, and for example, a pixel may be vertically divided into two, as illustrated in FIG. 12. Further, the division is not limited to the division into two, and for example, a pixel may be divided into four, as illustrated in FIG. 13, may be divided into three, or may be divided into other numbers. If a narrowed pixel with a small area is provided, even in a state where an opening of a diaphragm 14 is small, evaluation of focusing can be performed based on comparison between a first image and a second image. Further, a pixel may be divided using a curved line, such as a circle.

As described above, even if various narrowed pixels are used, these pixels similarly function to the above-described embodiment, and similar effects can be obtained.

Further, the narrowed pixel has a lower light receiving amount than the normal pixel because of a narrower light-receiving area than the normal pixel. Therefore, processing of correcting a difference of the light receiving amounts may be performed, or an exposure time may be adjusted for each pixel.

What is claimed is:

1. An imaging device comprising:
an imaging sensor comprising a light-receiving surface on which one or more optical elements focuses light, wherein the light receiving surface comprises:
a first photoelectric conversion structure having a first light-receiving surface area, wherein the first photoelectric conversion structure is configured to photoelectrically convert light incident on the first light-receiving surface area into a first signal; and
a second photoelectric conversion structure having a second light-receiving surface area, wherein the second light-receiving surface area is smaller than the first light-receiving surface area, and wherein the second photoelectric conversion structure is configured to photoelectrically convert light incident on the second light-receiving surface area into a second signal; and
one or more processors comprising hardware, wherein the one or more processors is/are configured to implement:
a focusing evaluation unit configured to perform a focus evaluation process comprising:
comparing a first value of a characteristic of the first signal and a second value of the characteristic of the second signal; and
determining whether focusing is achieved by the one or more optical elements based on a result of comparing the first value and the second value;
wherein the one or more optical elements comprises one or more focus lenses,
wherein the one or more processors is/are further configured to implement:
a lens control unit configured to control a position of the one or more focus lenses; and
an autofocus (AF) calculation unit configured to, prior to performing the focus evaluation process, perform a first autofocusing process of causing the lens control unit to control the position of the one or more focus lenses to achieve a first autofocused state, and
wherein the focusing evaluation unit determines whether focusing is achieved by the one or more optical elements in the first autofocused state based on the result of comparing the first value and the second value; and
wherein in response to the focusing evaluation unit determining that focusing is not achieved by the one or more optical elements in the first autofocused state:
the lens control unit is configured to change the position of the one or more focus lenses; and
the AF calculation unit is configured to perform a second autofocusing process of causing the lens control unit to control the position of the one or more focus lenses to achieve a second autofocused state.

2. The imaging device according to claim 1,
wherein in the focus evaluation process, the focus evaluation unit:
compares the first value and the second value by determining whether there is a difference between the first value and the second value; and
determines that the focusing is not achieved by the one or more optical elements in response to determining that there is a difference between the first value and the second value.

3. The imaging device according to claim 1,
wherein in the focus evaluation process, the focus evaluation unit:
compares the first value and the second value by determining whether there is a difference between the first value and the second value; and
determines that the focusing is not achieved by the one or more optical elements in response to determining that there is a difference between the first value and the second value.

4. The imaging device according to claim 1,
wherein the lens control unit is configured to move the position of the one or more focus lenses in a first direction to the first autofocused state, and
wherein, in response to the focusing evaluation unit determining that focusing is not achieved by the one or more optical elements in the first autofocused state, the lens control unit is configured to move the position of the one or more focus lenses in the first direction.

5. The imaging device according to claim 1,
wherein, in response to the focusing evaluation unit determining that focusing is not achieved by the one or more optical elements in the first autofocused state, the lens control unit is configured to change the position of the one or more focus lenses by a distance calculated based on the difference between the first value and the second value.

6. The imaging device according to claim 1,
wherein the lens control unit is configured to move the position of the one or more focus lenses in a first direction to the first autofocused state,
wherein in response to the focusing evaluation unit determining that focusing is not achieved by the one or more optical elements in the first autofocused state:
the lens control unit is configured to move the position of the one or more focus lenses in the first direction to change the position of the one or more focus lenses; and
the AF calculation unit is configured to perform a second autofocusing process of causing the lens control unit to control the position of the one or more focus lenses to achieve a second autofocused state,
wherein the focusing evaluation unit is configured to determine whether focusing is achieved by the one or more optical elements in the second autofocused state, and
wherein after the focusing evaluation unit determines that focusing is not achieved by the one or more optical elements in the second autofocused state:
the lens control unit is configured to move the position of the one or more focus lenses in a second direction opposite to the first direction; and
the AF calculation unit is configured to perform a third autofocusing process of causing the lens control unit to control the position of the one or more focus lenses to achieve a third autofocused state.

7. The imaging device according to claim 1,
wherein the first photoelectric conversion structure comprises a first pixel of a predetermined type of pixel,
wherein the predetermined type of pixel has a predetermined light-receiving surface area, and
wherein the first light-receiving surface area is the predetermined light-receiving surface area, and wherein the second photoelectric conversion structure comprises:
a second pixel of the predetermined type of pixel; and
a mask that shades a portion of the predetermined light-receiving surface area,
wherein the second light-receiving surface area is a portion of the predetermined light-receiving surface area not shaded by the mask.

8. The imaging device according to claim 7, wherein the second photoelectric conversion structure is configured to detect a phase difference.

9. The imaging device according to claim 1,
wherein the first photoelectric conversion structure comprises a first pixel of a predetermined type of pixel that has a plurality of regions,
wherein the first light-receiving surface area comprises a first group of one or more of the plurality of regions,
wherein the second photoelectric conversion structure comprises a second pixel of the predetermined type of pixel, and
wherein the second light-receiving surface area comprises a second group of one or more of the plurality of regions, wherein an area of the second group is different from an area of the first group.

10. A focusing evaluation device for evaluating a focusing of light by one or more optical elements on an imaging sensor,
wherein the imaging sensor comprises a light-receiving surface on which the one or more optical elements focuses the light,
wherein the light receiving surface comprises:
a first photoelectric conversion structure having a first light-receiving surface area, wherein the first photoelectric conversion structure is configured to photoelectrically convert light incident on the first light-receiving surface area into a first signal; and
a second photoelectric conversion structure having a second light-receiving surface area, wherein the second light-receiving surface area is smaller than the first light-receiving surface area, and wherein the second photoelectric conversion structure is configured to photoelectrically convert light incident on the second light-receiving surface area into a second signal, and
wherein the focusing evaluation device comprises:
one or more processors comprising hardware, wherein the one or more processors is/are configured to implement:
a focusing evaluation unit configured to perform a focus evaluation process comprising:
comparing a first value of a characteristic of the first signal and a second value of the characteristic of the second signal; and
determining whether focusing is achieved by the one or more optical elements based on a result of comparing the first value and the second value;
wherein the one or more optical elements comprises one or more focus lenses,
wherein the one or more processors is/are further configured to implement:
a lens control unit configured to control a position of the one or more focus lenses; and
an autofocus (AF) calculation unit configured to, prior to performing the focus evaluation process, perform a first autofocusing process of causing the lens control unit to control the position of the one or more focus lenses to achieve a first autofocused state, and
wherein the focusing evaluation unit determines whether focusing is achieved by the one or more optical elements in the first autofocused state based on the result of comparing the first value and the second value;
wherein in response to the focusing evaluation unit determining that focusing is not achieved by the one or more optical elements in the first autofocused state:
the lens control unit is configured to change the position of the one or more focus lenses; and
the AF calculation unit is configured to perform a second autofocusing process of causing the lens control unit to control the position of the one or more focus lenses to achieve a second autofocused state.

11. A non-transitory computer-readable storage device storing instructions, that when executed by one or more processors, cause the one or more processors to evaluate a focusing of light by one or more optical elements on an imaging sensor, the one or more optical elements comprises one or more focus lenses,
wherein the imaging sensor comprises a light-receiving surface on which the one or more optical elements focuses the light,
wherein the light receiving surface comprises:
a first photoelectric conversion structure having a first light-receiving surface area, wherein the first photoelectric conversion structure is configured to photoelectrically convert light incident on the first light-receiving surface area into a first signal; and
a second photoelectric conversion structure having a second light-receiving surface area, wherein the second light-receiving surface area is smaller than the first light-receiving surface area, and wherein the second photoelectric conversion structure is configured to photoelectrically convert light incident on the second light-receiving surface area into a second signal, and
wherein instructions cause the one or more processors to:
compare a first value of a characteristic of the first signal and a second value of the characteristic of the second signal; and
determine whether focusing is achieved by the one or more optical elements based on a result of comparing the first value and the second value;
control a position of the one or more focus lenses;
prior to performing the focus evaluation process, perform a first autofocusing process of controlling the position of the one or more focus lenses to achieve a first autofocused state,
determine whether focusing is achieved by the one or more optical elements in the first autofocused state based on the result of comparing the first value and the second value; and
where it is determined that focusing is not achieved by the one or more optical elements in the first autofocused state:
change the position of the one or more focus lenses; and
perform a second autofocusing process of controlling the position of the one or more focus lenses to achieve a second autofocused state.

* * * * *